(12) United States Patent
Aoki

(10) Patent No.: US 11,798,586 B2
(45) Date of Patent: Oct. 24, 2023

(54) SUSPENSION ASSEMBLY WITH WIRING MEMBER AND DISK DEVICE WITH THE SUSPENSION ASSEMBLY

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kenichiro Aoki, Machida Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/833,074

(22) Filed: Jun. 6, 2022

(65) Prior Publication Data

US 2023/0260542 A1 Aug. 17, 2023

(30) Foreign Application Priority Data

Feb. 15, 2022 (JP) ................................ 2022-021348

(51) Int. Cl.
 *G11B 5/48* (2006.01)
(52) U.S. Cl.
 CPC ............ *G11B 5/4846* (2013.01); *G11B 5/486* (2013.01); *G11B 5/4833* (2013.01); *G11B 5/4853* (2013.01)
(58) Field of Classification Search
 None
 See application file for complete search history.

(56) References Cited

U.S. PATENT DOCUMENTS

| | | | |
|---|---|---|---|
| 7,724,478 B2 | 5/2010 | Deguchi et al. | |
| 8,295,013 B1 * | 10/2012 | Pan et al. ............... | G11B 5/486 360/245.4 |
| 8,295,014 B1 * | 10/2012 | Teo et al. ............... | G11B 5/486 360/245.9 |
| 8,320,084 B1 * | 11/2012 | Shum et al. ........... | G11B 5/486 360/245.9 |
| 8,325,446 B1 * | 12/2012 | Liu et al. .............. | G11B 5/4833 360/245.9 |
| 8,446,696 B2 | 5/2013 | Feng et al. | |
| 8,477,459 B1 * | 7/2013 | Pan ....................... | G11B 5/4846 360/245.9 |
| 8,665,566 B1 * | 3/2014 | Pan et al. .............. | G11B 5/4846 360/264.2 |
| 8,760,812 B1 * | 6/2014 | Chen et al. ........... | G11B 5/4846 360/244.1 |

(Continued)

*Primary Examiner* — Craig A. Renner
(74) *Attorney, Agent, or Firm* — Kim & Stewart LLP

(57) ABSTRACT

According to one embodiment, a suspension assembly includes a support plate, a head supported by the support plate, and a wiring member on the support plate. The wiring member includes a distal-end portion electrically connected to the head, a connection end portion extending outside the support plate. The connection end portion includes a cover layer with an opening having a length, thirteen or more connection terminals opposed to the opening, arranged at intervals in a length direction of the opening and connected to wires, respectively, and a base layer superposed on the cover layer and the connection terminals and having first openings opposed to part of each of the connection terminals and second openings opposed to a space between adjacent connection terminals.

14 Claims, 11 Drawing Sheets

(56) References Cited

U.S. PATENT DOCUMENTS

| | | | |
|---|---|---|---|
| 8,934,199 B1* | 1/2015 | Pan | G11B 5/4846 |
| | | | 360/245.4 |
| 8,934,201 B1 | 1/2015 | Feng et al. | |
| 8,941,952 B1* | 1/2015 | Pan et al. | G11B 5/4846 |
| | | | 360/244.1 |
| 9,972,347 B1* | 5/2018 | Pan et al. | G11B 5/4846 |
| 10,373,635 B2 | 8/2019 | Kikuchi | |
| 10,657,993 B1* | 5/2020 | Uehara et al. | G11B 5/4813 |
| 2010/0296195 A1* | 11/2010 | Kikuchi et al. | G11B 5/4846 |
| | | | 360/245 |
| 2019/0295600 A1* | 9/2019 | Yoshikawa et al. | G11B 5/4853 |

* cited by examiner

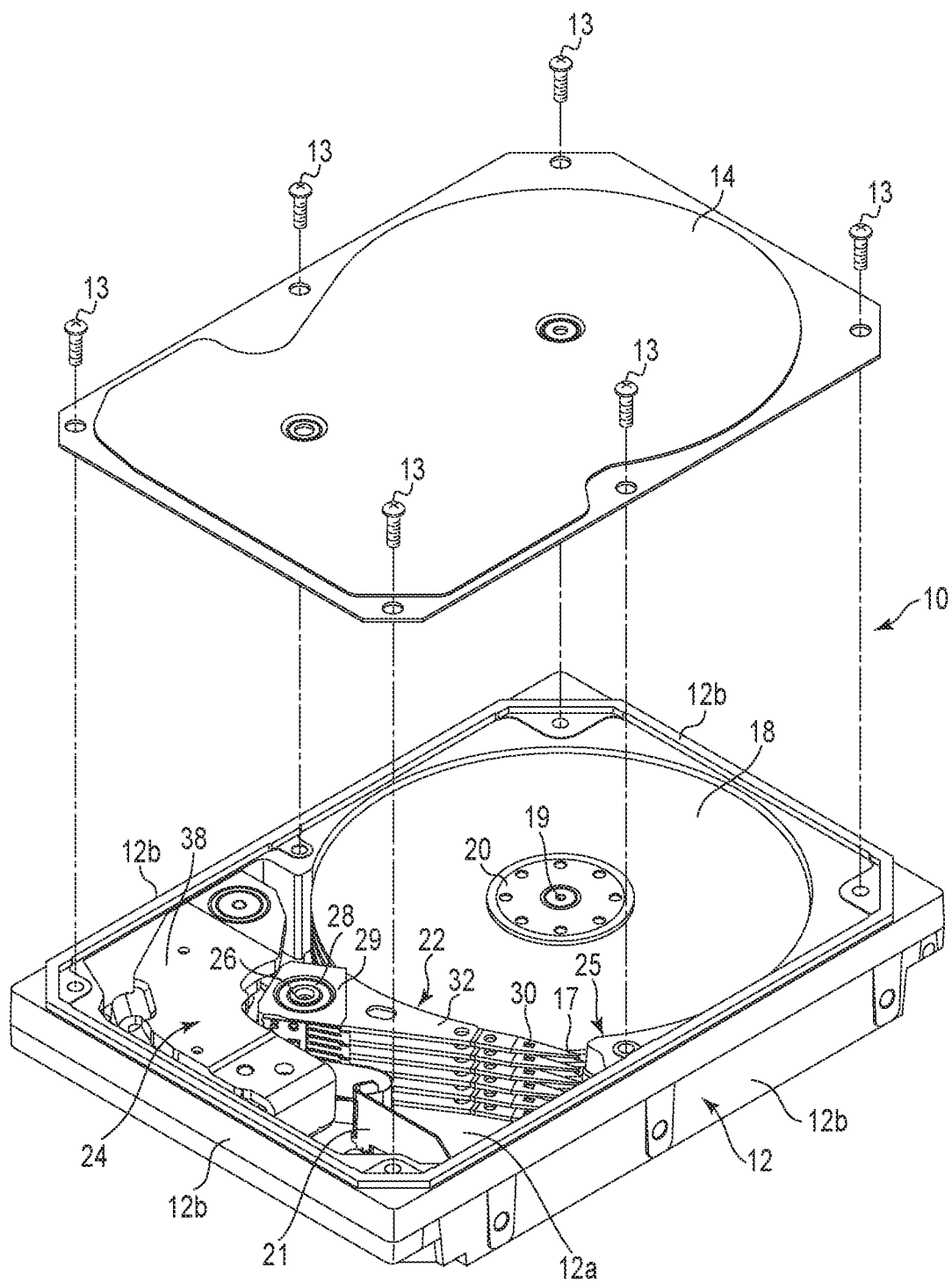
F I G. 1

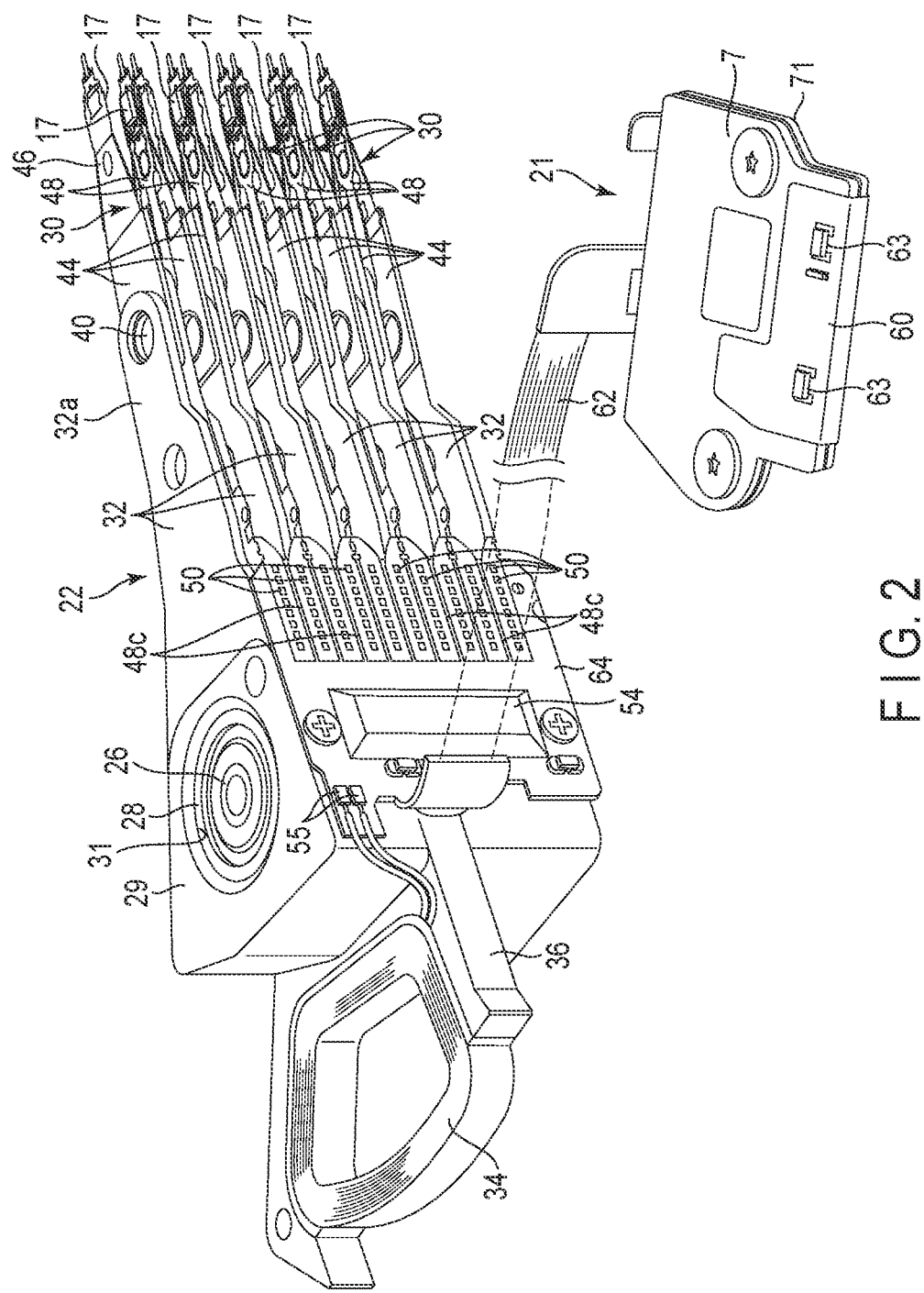
F I G. 2

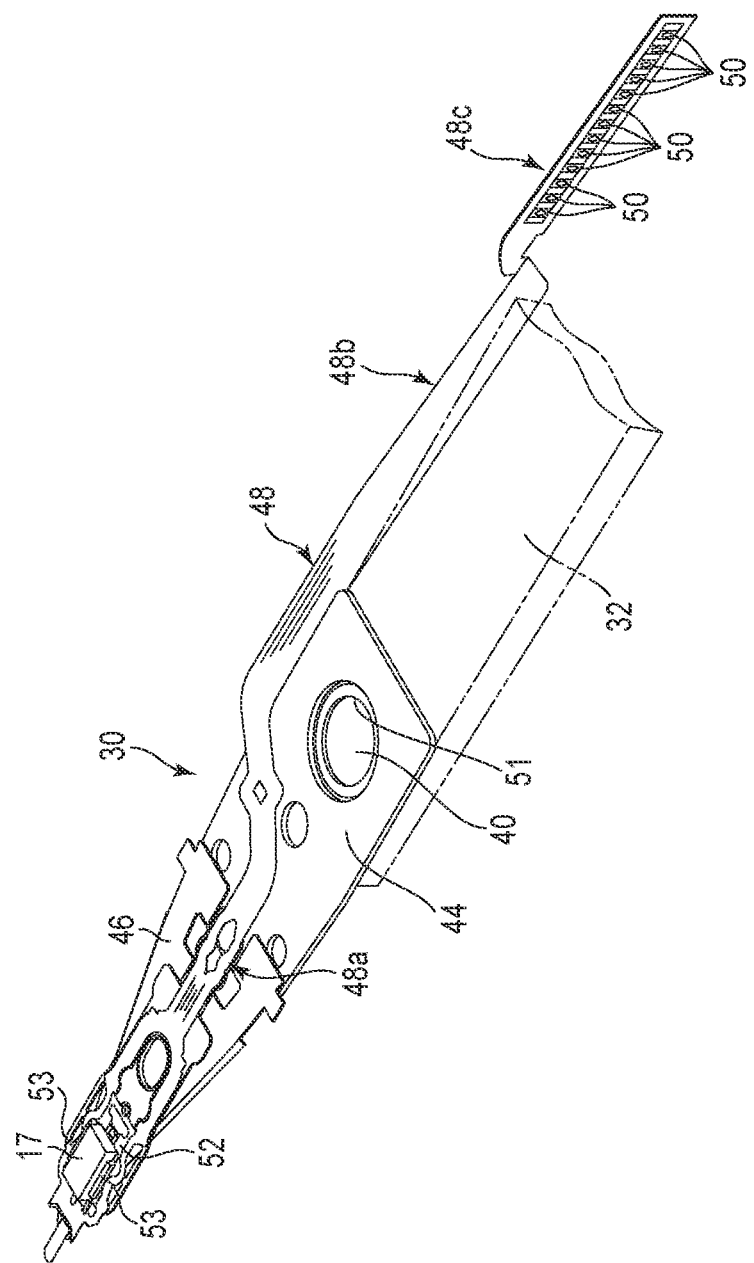
F I G. 3

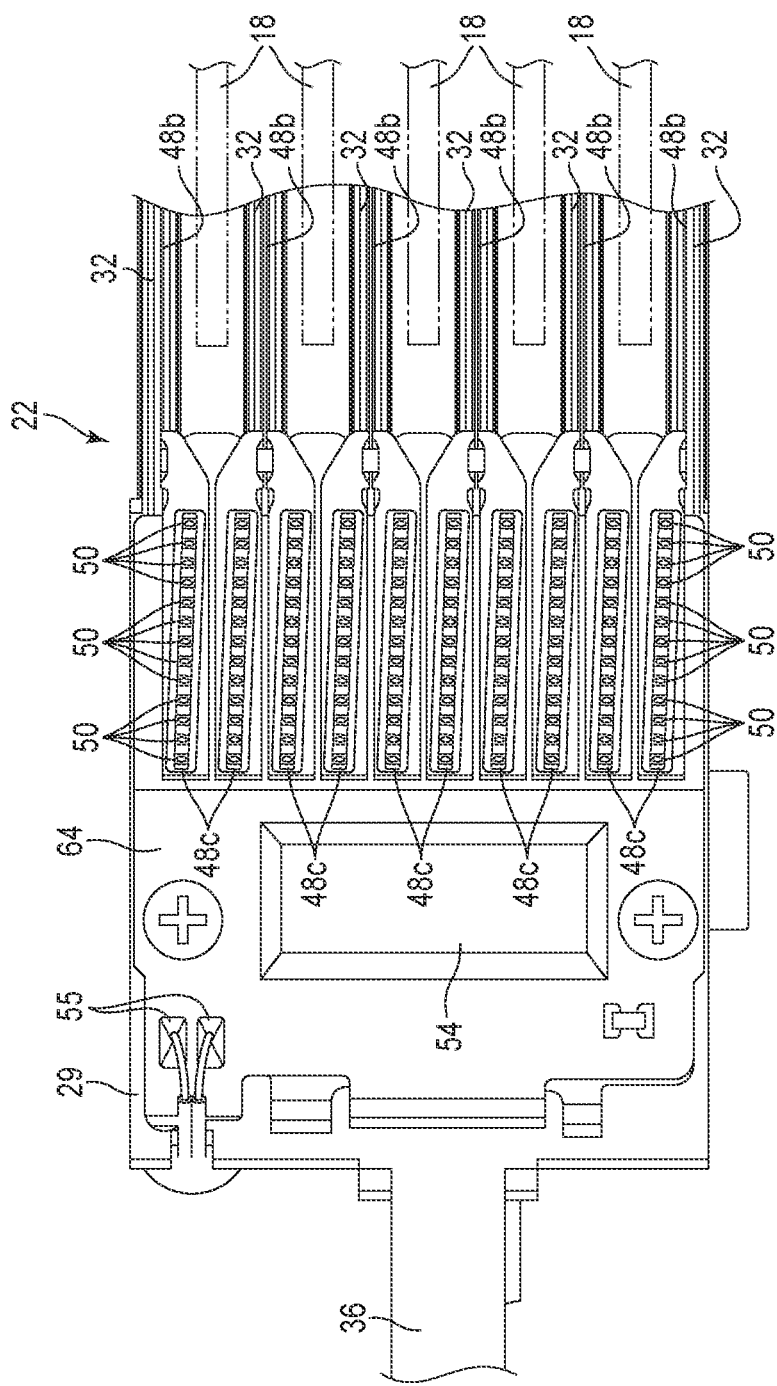
F I G. 4

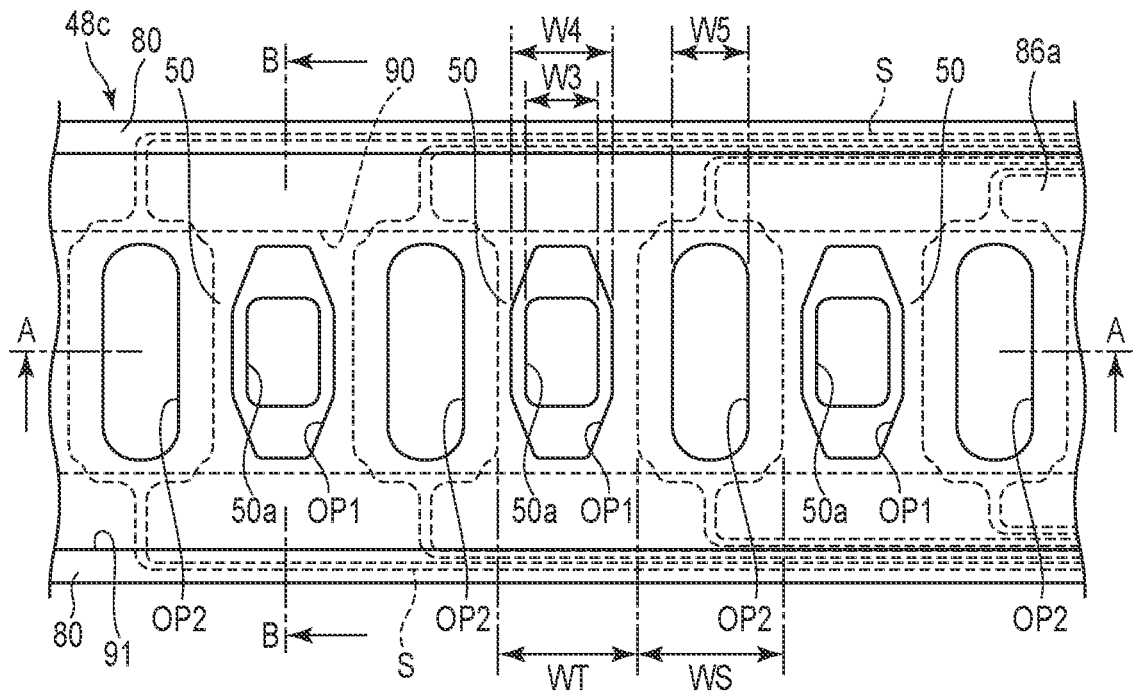
F I G. 8
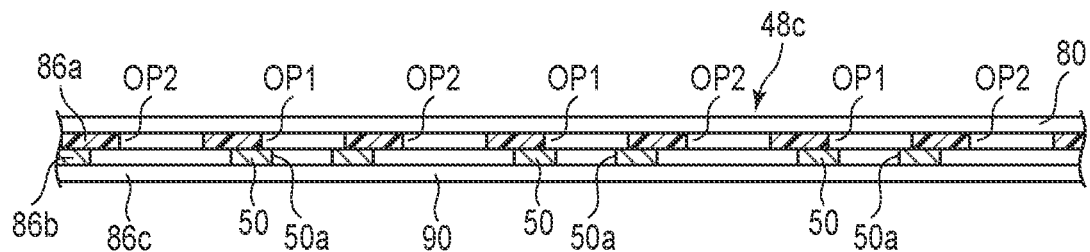
F I G. 9
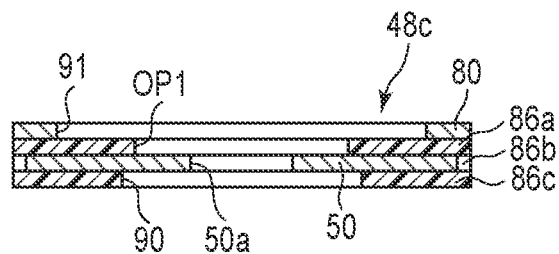
F I G. 10

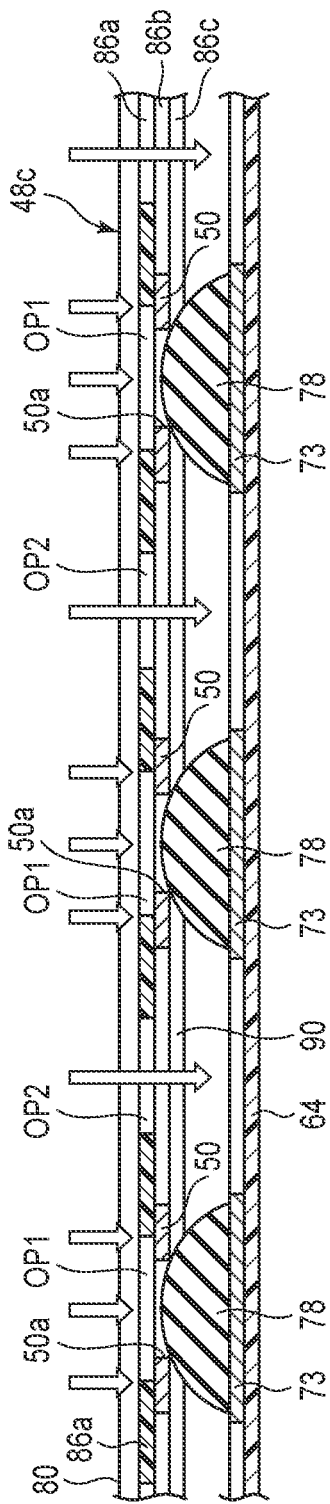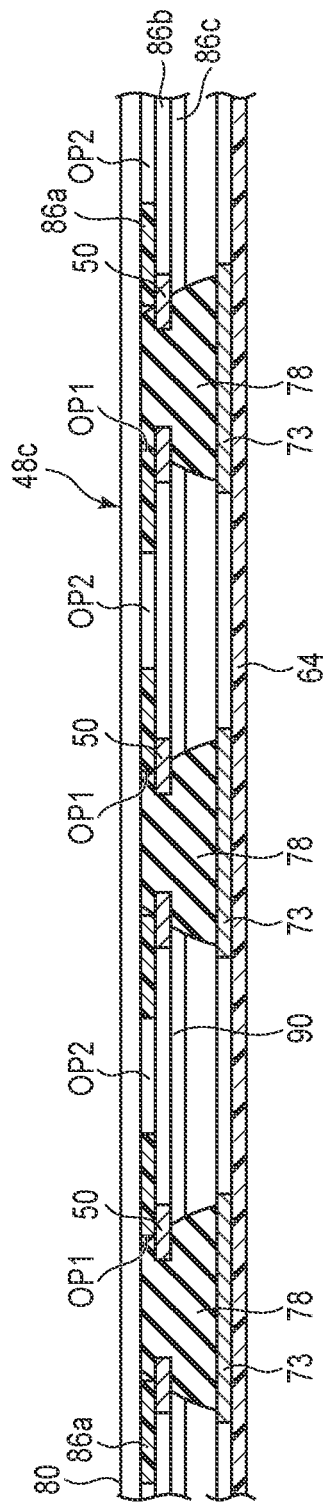

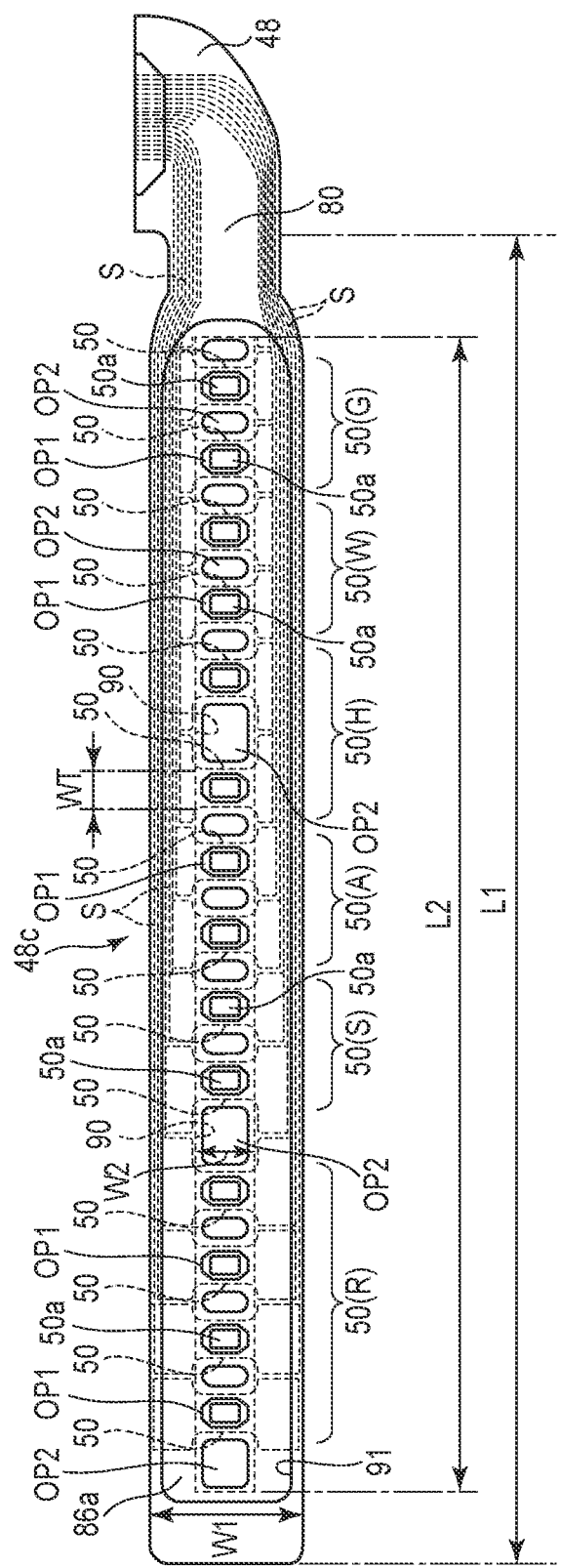
F I G. 14

SUSPENSION ASSEMBLY WITH WIRING MEMBER AND DISK DEVICE WITH THE SUSPENSION ASSEMBLY

CROSS-REFERENCE TO RELATED APPLICATIONS

This application is based upon and claims the benefit of priority from Japanese Patent Application No. 2022-021348, filed Feb. 15, 2022, the entire contents of which are incorporated herein by reference.

FIELD

Embodiments described herein relate generally to a disk device and suspension assembly for use in the disk device.

BACKGROUND

As a disk device, for example, a magnetic disk device generally includes a magnetic disk disposed in a base, a spindle motor that supports and rotates the magnetic disk, and a head actuator. The head actuator includes a plurality of suspension assemblies each supporting a magnetic head. Each of the suspension assemblies includes a suspension attached to a distal end portion of an arm of the head actuator and a wiring member (flexure, wiring trace) placed on the suspension. The magnetic head is supported on a gimbal portion of the wiring member to constitute a head suspension assembly. A plurality of connection terminals are provided at a connection end portion of the wiring member. The connection terminals are electrically connected to the magnetic head through the wiring of the wiring member. The connection terminals are soldered to connection pads of a flexible printed circuit board (FPC) provided in the actuator block.

In recent years, in order to further increase the density and reliability of magnetic disk drives, studies have been made to add functions such as a head disk interface (HDI) sensors, a multistage actuator, a dynamic flying height (DFH) control function, and a function such as high-frequency assist recording and thermal assist recording, to a head or a suspension assembly. Accordingly, it is necessary to further increase the number of wires of a wiring member and the number of connection terminals provided at the connection ends of the wiring member.

In order to secure an area where a large number of wires are placed, it is necessary to reduce the width of each of the wires and to draw the wires with narrow pitches. In order to achieve the narrower pitches, it is necessary to reduce the thickness of each of the wires. If, however, the wires are thinned, the connection terminals (flying leads) formed in the same layer as the wires are also thinned, resulting in the problem of decreasing the strength of the connection terminals.

BRIEF DESCRIPTION OF THE DRAWINGS

FIG. 1 is an exploded perspective view of a hard disk drive (HDD) according to a first embodiment.

FIG. 2 is a perspective view showing a board unit (FPC unit) and an actuator assembly of the HDD.

FIG. 3 is a perspective view showing a suspension assembly of the actuator assembly.

FIG. 4 is a side view showing an actuator block of the actuator assembly, a bonding portion of the FPC unit (FPC bonding portion), and a tail connection end portion of a flexure.

FIG. 8 is an enlarged plan view of part of the tail connection end portion.

FIG. 9 is a sectional view of the tail connection end portion along line A-A of FIG. 8.

FIG. 10 is a sectional view of the tail connection end portion along line B-B of FIG. 8.

FIG. 11A is a sectional view showing a state in which the tail connection end portion is superposed on the bonding portion.

FIG. 11B is a sectional view of the tail connection end portion and the bonding portion which are bonded by solder.

FIG. 14 is a plan view showing a connection end portion of a flexure for use in an HDD according to a fourth embodiment.

DETAILED DESCRIPTION

Figure 5:
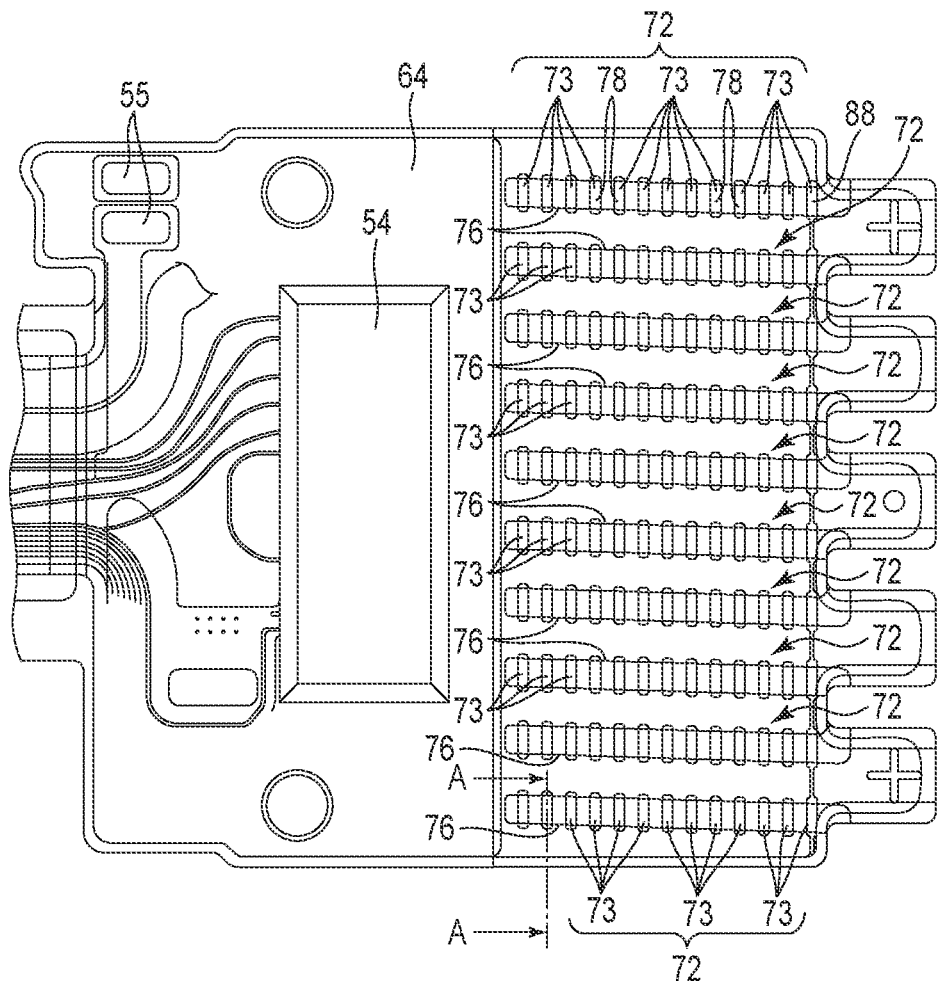
FIG. 5 is a side view of the bonding portion of the FPC unit.

Various embodiments will be described hereinafter with reference to the accompanying drawings. In general, according to one embodiment, a suspension assembly comprises a support plate; a head supported by the support plate; and a wiring member placed on the support plate. The wiring member includes a distal-end portion electrically connected to the head, a connection end portion extending outside the support plate, and a plurality of wires extending between the distal-end portion and the connection end portion. The connection end portion includes a cover layer with an opening having a predetermined length, thirteen or more connection terminals opposed to the opening, arranged at intervals in a length direction of the opening and connected to the wires, respectively, and a base layer superposed on the cover layer and the connection terminals and having a plurality of first openings opposed to part of each of the connection terminals and a plurality of second openings opposed to a space between adjacent connection terminals.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

First Embodiment

A hard disk drive (HDD) according to a first embodiment will be described in detail as a disk device.

FIG. 1 is an exploded perspective view of the HDD according to the first embodiment shown with its top cover removed.

The HDD includes a flat, substantially rectangular housing 10. The housing 10 includes a rectangular box-shaped base 12 whose top is open and a top cover 14. The base 12 has a rectangular bottom wall 12a facing the top cover 14 with a gap therebetween and a plurality of side walls 12b erected along the periphery of the bottom wall 12a, and is molded of, for example, aluminum integrally with them. The top cover 14 is formed of, for example, stainless steel in a rectangular plate shape. The top cover 14 is screwed onto the side walls 12b of the base 12 by a plurality of screws 13 to close the opening of the base 12.

The housing 10 includes plurality of magnetic disks 18 serving as a recording medium and a spindle motor 19 serving as a drive unit that supports and rotates the magnetic disks 18. The spindle motor 19 is disposed on the bottom wall 12a. Each of the magnetic disks 18 is formed, for example, in the shape of a disk having a diameter of 96 mm (3.5 inches), and includes a substrate made of a nonmagnetic substance such as glass and aluminum, and a magnetic recording layer formed on the upper surface and/or the lower surface of the substrate. The magnetic disks 18 are coaxially fit to a hub (not shown) of the spindle motor 19 and clamped by a clamp spring 20, with the result that they are fixed to the hub. The magnetic disks 18 are supported in a position parallel to the bottom wall 12a of the base 12. The magnetic disks 18 are rotated by a spindle motor 19 at a predetermined number of revolutions. In the first embodiment, for example, five magnetic disks 18 are held in the housing 10, but the number of magnetic disks 18 is not limited to five.

The housing 10 also includes a plurality of magnetic heads 17 that record and reproduce information on and from the magnetic disks 18, and an actuator assembly (carriage assembly) 22 that supports the magnetic heads 17 movably to the magnetic disks 18. The housing 10 also includes a voice coil motor (hereinafter referred to as VCM) 24 that rotates and position the actuator assembly 22, a ramp load mechanism 25 that holding the magnetic heads 17 in an unload position separated from the magnetic disks 18 when the magnetic heads 17 move to the outermost peripheries of the magnetic disks 18, and a board unit (FPC unit) 21 on which electronic components such as a conversion connector are mounted. The actuator assembly 22 and the VCM 24 constitute a head actuator.

The actuator assembly 22 includes an actuator block 29 that is supported rotatably around a support shaft 26 via a bearing unit 28, a plurality of arms 32 extending from the actuator block 29, and suspension assemblies 30 extending from their respective arms 32. The magnetic heads 17 are each supported at a distal end portion of each of the suspension assemblies 30. The support shaft 26 is erected on the bottom wall 12a. The magnetic heads 17 each include a read head, a write head, an assist element, a heater and the like.

A printed circuit board (not shown) is screwed to the outer surface of the bottom wall 12a of the base 12. The printed circuit board is configured as a controller, which controls the operation of the spindle motor 19 and controls the operations of the VCM 24 and the magnetic heads 17 via the board unit 21.

FIG. 2 is a perspective view of the actuator assembly and the FPC unit, and FIG. 3 is a perspective view showing a suspension assembly. As shown in FIG. 2, the actuator assembly 22 includes an actuator block 29 having a through hole 31, a bearing unit (unit bearing) 28 provided in the through hole 31, a plurality of arms 32 (e.g., six arms) extending from the actuator block 29, suspension assemblies 30 attached to their respective arms 32, and magnetic heads 17 supported by the suspension assemblies 30. The actuator block 29 is supported by the bearing unit 28 rotatably around the support shaft (pivot) 26 erected on the bottom wall 12a.

In the first embodiment, the actuator block 29 and the six arms 32 are formed of aluminum or the like integrally as a so-called E block. The arms 32 are each formed in an elongated flat plate shape, for example, and extend from the actuator block 29 in a direction orthogonal to the support shaft 26. The six arms 32 are provided in parallel with each other with a gap therebetween.

The actuator assembly 22 includes a support frame 36 extending from the actuator block 29 in a direction opposite to the arms 32. The support frame 36 supports a voice coil 34. As shown in FIG. 1, the voice coil 34 is located between paired yokes 38 one of which is fixed on the base 12, and constitutes the VCM 24 together with the yokes 38 and a magnet fixed to one of the yokes.

The actuator assembly 22 includes ten suspension assemblies 30 that support their respective magnetic heads 17, and the suspension assemblies 30 are attached to the distal end portions 32a of the arms 32, respectively. The suspension assemblies 30 include an up-head suspension assembly that supports the magnetic heads 17 upward and a down-head suspension assembly that supports the magnetic heads 17 downward. These up-head and down-head suspension assemblies are configured by arranging the suspension assemblies 30 having the same structure in different vertical directions.

In the first embodiment, in FIG. 2, a down-head suspension assembly 30 is attached to the uppermost arm 32, and the up-head suspension assembly 30 is attached to the lowermost arm 32. The up-head and down-head suspension assemblies 30 are attached to each of the other intermediate four arms 32.

As shown in FIG. 3, the suspension assembly 30 includes a substantially rectangular base plate 44, an elongated leaf spring-like load beam 46, and an elongated band-like flexure (wiring member) 48. The proximal end portion of the load beam 46 is fixed to the end portion of the base plate 44. The load beam 46 extends from the base plate 44 and is tapered toward the extended end. The base plate 44 and load beam 46 are formed of, for example, stainless steel and constitute a support plate (suspension).

The base plate 44 has a circular opening at its proximal end portion and an annular projection 51 located around the opening. The protrusion 51 of the base plate 44 is fit into a swaging hole 40 formed in the distal end portion 32a of the arm 32, and the protrusion 51 is swaged, with the result that the base plate 44 is fastened to the distal end portion 32a of the arm 32 (see FIG. 2). The proximal end portion of the load beam 46 is superposed on the distal end portion of the base plate 44 and fixed to the base plate 44 by welding a plurality of portions thereof.

The flexure 48 of the suspension assembly 30 includes a metal plate (backing layer) of stainless steel or the like, which serves as a base, and a flexible printed circuit board (FPC) placed on the metal plate to form an elongated band-like laminated plate.

The flexure 48 has a distal end portion 48a and a proximal end portion 48b. The distal portion 48a is attached to the load beam 46 and the base plate 44. The proximal end portion 48b extends outwardly from the side edge of the base plate 44 and further extends along the arm 32 to the proximal end portion (actuator block 29) of the arm 32.

The flexure 48 has a distal end portion located on the load beam 46 and a displaceable gimbal portion (elastic support portion) 52 formed at the distal end portion of the flexure 48.

The magnetic head 17 is mounted on the gimbal portion 52. In addition, a pair of piezoelectric elements 53 constituting a micro-actuator is mounted on the gimbal portion 52 and arranged on both sides of the magnetic head 17. The distal end portion of the flexure 48 is electrically connected to read and write head elements of the magnetic head 17, a heater, an assist element, an HDI sensor, the piezoelectric elements 53, and other members via a wire and a connection pad (neither of which is shown).

The proximal end portion 48b of the flexure 48 has a connection end portion (tail connection end portion) 48c at one end. The connection end portion 48c is formed in an elongated rectangular shape. The connection end portion 48c is bent substantially at a right angle to the proximal end portion 48b and located substantially perpendicularly to the arm 32. The connection end portion 48c is provided with a plurality of connection terminals (connection pads) 50. The number of connection terminals 50 is, for example, 13. The connection terminals 50 are connected to their respective wires of the flexure 48. That is, the wirers of the flexure 48 extend almost all over the length of the flexure 48. One end of each of the wires is electrically connected to its corresponding magnetic head 17, and the other end is connected to its corresponding connection terminal (connection pad) 50 of the connection end portion 48c.

As shown in FIG. 2, the ten suspension assemblies 30 extend from the six arms 32 and are arranged opposite to each other substantially in parallel and at predetermined intervals. The suspension assemblies 30 are configured by five down-head suspension assemblies and five up-head suspension assemblies. The down-head and up-head suspension assemblies 30 of each set are located in parallel with each other at a predetermined interval, and the magnetic heads 17 are opposed to each other. The magnetic heads 17 are each located to face both sides of its corresponding magnetic disk 18.

As shown in FIG. 2, the FPC unit 21 includes a substantially rectangular base portion 60, an elongated band-like relay portion 62 extending from one side edge of the base portion 60, and a substantially rectangular bonding portion (FPC joint portion) 64 provided continuously with the distal end portion of the relay portion 62, which are formed integrally as one unit. The base portion 60, relay portion 62 and bonding portion 64 are formed by a flexible printed circuit board (FPC).

Electronic components such as a conversion connector (not shown) and a plurality of capacitors 63 are mounted on one surface (outer surface) of the base portion 60 and electrically connected to the lines (not shown). Two metal plates 70 and 71 functioning as reinforcing plates are attached to the other surface (inner surface) of the base portion 60. The base portion 60 is placed on the bottom wall 12a of the housing 10 and screwed to the bottom wall 12a by two screws. The conversion connector on the base portion 60 is connected to a control circuit board provided on the bottom surface side of the housing 10.

The relay portion 62 extends from the base portion 60 toward the actuator assembly 22. The bonding portion 64 provided at the extended end of the relay portion 62 is formed in a rectangular shape and its height and width are substantially equal to those of the side surface (placement surface) of the actuator block 29. The bonding portion 64 is attached to the placement surface of the actuator block 29 via a backing plate formed of aluminum or the like, and is further fixed to the placement surface by fixing screws.

The connection end portions 48c of the ten flexures 48 are bonded to a plurality of connection portions of the bonding portion 64 and electrically connected to the wires of the bonding portion 64. The connection end portions 48c are arranged side by side in a direction parallel to the support shaft 26. A head IC (head amplifier) 54 is mounted on the bonding portion 64 and connected to the connection end portions 48c and the base portion 60 through the wires of the FPC. In addition, the bonding portion 64 includes a pair of connection pads 55, and the voice coil 34 is connected to the connection pads 55.

The ten magnetic heads 17 of the actuator assembly 22 are electrically connected to the base portion 60 through the wires of the flexures 48, connection end portions 48b, bonding portion 64 of the FPC unit 21 and relay portion 62. Further, the base portion 60 is electrically connected to the printed circuit board on the bottom surface side of the housing 10 via the conversion connector.

The wiring structure of the bonding portion 64 will be described in detail. FIG. 4 is a side view showing a plurality of connection end portions and the bonding portion 64 attached to the actuator block. FIG. 5 is a side view showing the bonding portion 64 to which the connection end portions have not been bonded.

As shown in FIG. 5, the bonding portion 64 includes ten connection pad groups 72 corresponding to the connection end portions 48c of the suspension assembly 30. Each of the connection pad groups 72 includes a plurality of (e.g., 13) connection pads 73 arranged in a line, and each of the connection pads 73 is electrically connected to the head IC 54 or the base portion 60 via a wire. The thirteen connection pads 73 of each connection pad group 72 are arranged at predetermined intervals in a line in a direction substantially parallel to the arm 32. The ten connection pad groups 72 are arranged at predetermined intervals and substantially in parallel with each other in a direction parallel to the support shaft 26, that is, in the height direction of the actuator block 29. The connection pads 73 are located in a belt-like opening 76 formed in a cover insulating layer of the FPC, which will be described later, and are exposed to the outside through the opening. In addition, solder layers 78 are formed on their respective connection pads 73 in a state where the connection end portions 48c have not been bonded.

As shown in FIGS. 4 and 5, the bonding portion 64 of the FPC is fixed to the placement surface of the actuator block 29 via a backing plate. The connection end portions 48c of the flexures 48 are superposed on their respective connection pad groups 72 of the bonding portion 64. The connection terminals 50 of the connection end portions 48c are brought into contact with their respective connection pads 73 via the solder layers 78. As will be described later, the solder layers 78 are melted by laser irradiation, whereby each of the connection terminals 50 is mechanically and electrically soldered to its corresponding connection pad 73.

Next is a detailed description of configurations of the flexure 48 and the connection end portion 48c.

Figure 6:
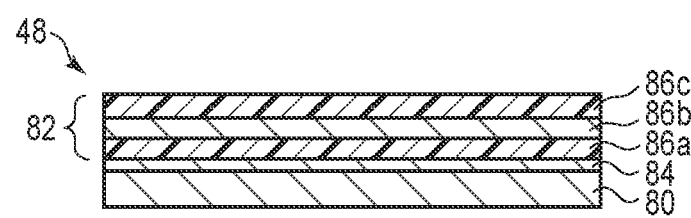
FIG. 6 is a sectional view of the flexure.
Figure 7:
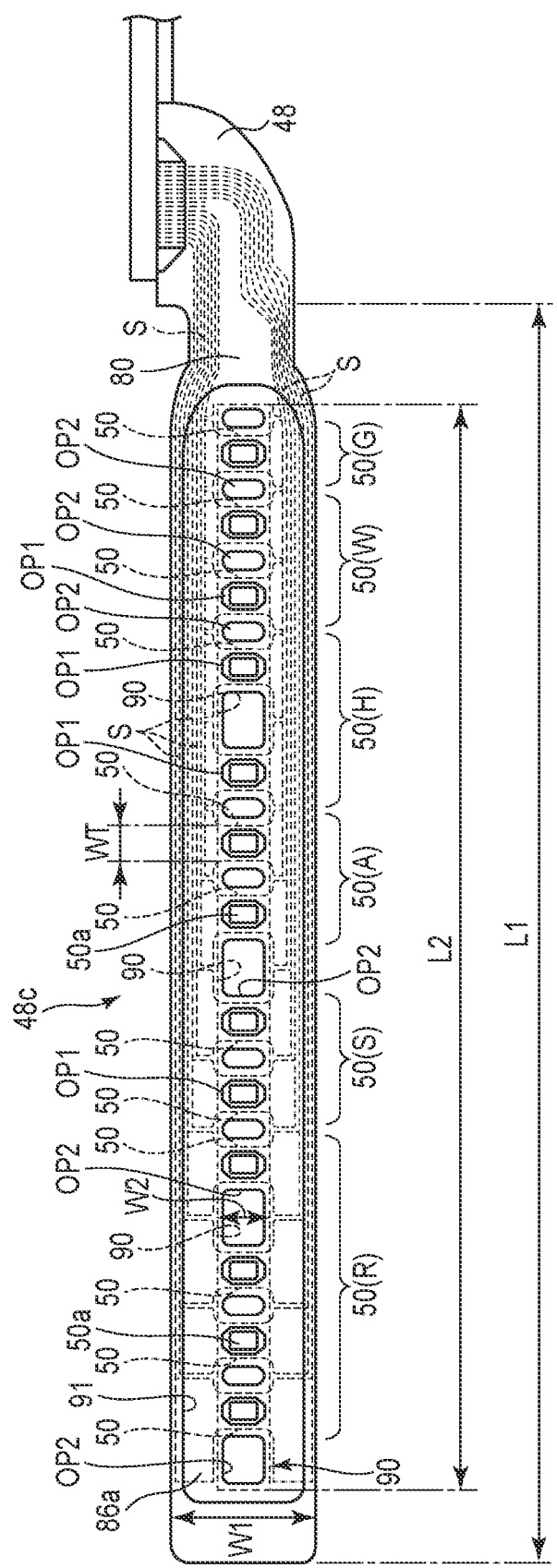
FIG. 7 is a plan view of the tail connection end portion of the flexure.

FIG. 6 is a sectional view showing a stacked structure of the flexure 48, and FIG. 7 is an enlarged plan view of the connection end portion of the flexure.

As shown in FIG. 6, the flexure 48 includes a metal plate (backing layer) 80 of stainless steel or the like serving as a base layer, and a flexible printed circuit board (FPC) 82 formed on the metal plate. In the first embodiment, an adhesive layer (heat insulating layer) 84 is provided between the metal plate 80 and the FPC 82. The FPC 82 is configured by a laminate including a base insulating layer 86a, a conductive layer 86b laminated on the base insulating layer 86a, and a cover insulating layer (protective layer) 86c laminated on the base insulating layer 86a and conductive layer 86b. The base insulating layer 86a and the cover insulating layer 86c are formed of, for example, polyimide. The conductive layer 86b is formed of, for example, copper foil, and the copper foil is patterned to form a plurality of wires, connection terminals and connection pads. The thickness of the conductive layer (copper foil) 86b is, for example, 9 μm or less. It should be noted that the FPC 82 is not limited to a single-layer structure, but may be a multilayer FPC including a plurality of conductive layers and a plurality of cover insulating layers. The adhesive layer (heat insulating layer) 84 can be excluded.

As shown in FIG. 7, the connection end portion 48c of the flexure 48 is shaped like a substantially elongated rectangle having length L1 and width W1. The connection end portion 48c includes a metal plate 80, a base insulating layer 86a provided on the metal plate 80, a conductive layer 86b provided on the base insulating layer 86a to form wires and connection terminals, and a cover insulating layer 86c superposed on the conductive layer 86b and the base insulating layer 86a. In FIG. 7, the lowermost layer corresponds to the cover insulating layer 86c, and the uppermost layer corresponds to the metal plate 80. The side of the cover insulating layer 86c is in contact with the bonding portion 64 of the FPC unit.

The cover insulating layer 86c has a rectangular opening 90 formed in its central part. The opening 90 has, for example, length L2 of 6 mm or less in the longitudinal direction and width W2 of 0.5 mm. The thirteen connection terminals 50 described above are each opposed to the opening 90 and are arranged at intervals in the longitudinal direction of the opening 90. Each of the connection terminals 50 is shaped like, for example, a rectangle and extends from one end of the cover insulating layer 86c to the other end thereof in the width direction. The central part (flying lead) of the connection terminal 50 is opposed to the opening 90, and both end portions of the connection terminal 50 are superposed on the cover insulating layer 86c.

In the cover insulating layer 86c, a plurality of wires S are provided in each of the regions on both sides of the opening 90 in its width direction. The connection terminals 50 are connected to the wires S. Accordingly, the thirteen connection terminals 50 are electrically connected to the connection pads at the distal end portions of the flexure 48 via the wires S.

The base insulating layer 86a is superposed on the entire surface of the cover insulating layer 86c, the thirteen connection terminals 50 and the wires S. The metal plate 80 has a substantially rectangular opening 91 formed in its central part. The opening 91 is formed to have a length and a width which are sufficiently greater than those of the opening 90 of the cover insulating layer 86c. The metal plate 80 thus covers the outer peripheral edge portion and proximal end portion of the connection end portion 48c.

FIG. 8 is an enlarged plan view showing part of the connection end portion 48c. As shown in FIGS. 7 and 8, the width WT of the central part of each of the connection terminals 50 opposed to the opening 90 of the cover insulating layer 86c (the interval between paired side edges) is, for example, 0.2 mm. The interval WS between the connection terminals 50 is 0.15 mm or more. There is an interval WS or a gap between one end of the opening 90 in its longitudinal direction and the connection terminal 50 and between the other end of the opening 90 in its longitudinal direction and the connection terminal 50.

The interval between the connection terminals 50 may be set equally, but in the first embodiment, a wide interval (e.g., 0.3 mm) is set at intervals of three connection terminals 50 from the extended end side of the connection end portion 48c. The wide interval is provided to place a jig for soldering the connection terminals 50.

A through hole 50a is provided at a central part of each of the connection terminals 50. As one example, the through hole 50a is substantially rectangular. The width W3 of the through hole 50a is smaller than the width WT of each connection terminal 50, and the length thereof is also smaller than the width W2 of the opening 90. The through hole 50a communicates with the opening 90.

The ratio of the area of all the connection terminals 50 (including through-hole portions) to the area of the opening 90 is 40% or more, for example, 43%.

In the first embodiment, the thirteen connection terminals 50 are arranged in the order described below, in consideration of the influence of crosstalk. As shown in FIG. 7, as one example, four connection terminals 50(R) for the read head, two connection terminals 50(S) for the HDI sensor, two connection terminals 50(A) for the assist element (high-frequency assist element or thermal assist element), two connection terminals 50(H) for the heater, two connection terminals 50(W) for the write head, and one connection terminal 50(G) for the gimbal micro-actuator (GMA) (piezoelectric element 53) are arranged in this order from the extended end side of the connection end portion 48c. That is, the connection terminal 50(A) for the assist element is disposed at the middle part (6th and 7th from the proximal side) in the arrangement direction, the connection terminal 50(W) for the write head is disposed at the proximal end side of the connection end portion 48c, and the connection terminal 50(H) for the heater is disposed between the connection terminal 50(A) for the assist element and the connection terminal 50(W) for the write head. The connection terminal 50(R) for the read head is disposed on the distal end side of the connection end portion 48b, and the connection terminal 50(S) for the HDI sensor is provided between the connection terminal 50(A) for the assist element and the connection terminal 50(R) for the read head.

According to the foregoing arrangement, the interval between the connection terminal 50(W) for the write head and the connection terminal 50(A) for the assist element can be widened, as can be the interval between the connection terminal 50(R) for the read head and the connection terminal 50(A) for the assist element, thereby making it possible to prevent crosstalk between the terminals during driving. In addition, the connection terminal 50(W) for the write head is provided at the proximal end portion of the connection end portion 48c to make it possible to shorten the length of a wire between the connection terminal 50(W) and the magnetic head 17 and thus reduce the impedance of the wires. Note that the arrangement of the connection terminals 50 is not limited to that described above. To avoid crosstalk, the connection terminals 50 have to be so arranged that the connection terminal for the write head and the connection terminal for the read head are not to be adjacent to the connection terminal for the assist element.

As shown in FIGS. 7 and 8, the base insulating layer 86a that covers the connection terminal 50 and the wires S include a plurality of first openings OP1 and a plurality of second openings OP2 which are arranged in the longitudinal direction of the connection end portion 48c. The first openings OP1 are provided opposite to their respective connection terminals 50. The second openings OP2 are provided opposite to a space between the connection terminals 50.

As shown in FIG. 8, the first openings OP1 are opposed to the through holes 50a of the connection terminal 50. The width W4 of each of the first openings OP1 is greater than the width W3 of each of the through holes 50a and smaller than the width WT of the connection terminal 50. In the longitudinal direction of the opening 90, the side edge of each of the first openings OP1 is located between the side edge (peripheral edge) of its corresponding through hole 50a and the side edge of the connection terminal 50. In the width direction of the opening 90, the length of each of the first openings OP1 is greater than the length of its corresponding through hole 50a and smaller than that of its corresponding connection terminal 50 (width W2 of the opening 90). In the first openings OP1, regions (both end portions) located outside the through hole 50a in its longitudinal direction are each gradually narrowed toward the root side of the connection terminal 50.

The second openings OP2 are each opposed to a space between two adjacent connection terminals 50 and a space between one end of the opening 90 in its longitudinal direction and the corresponding connection terminal 50 or between the other end of the opening 90 and the corresponding connection terminal 50. Each of the second openings OP2 has a substantially rectangular shape corresponding to the shape of the space. The width W5 of each of the second openings OP2 is smaller than the width WS of the space, and the length of each of the second openings OP2 is smaller than the width W2 of the opening 90. Thus, the peripheral edge of each of the second openings OP2 is slightly separated from the side edge of its corresponding connection terminal 50 and the side edge of the opening 90. In the longitudinal direction of the opening 90, the side edge of each of the connection terminals 50 is positioned between the side edge of the corresponding first opening OP1 and the side edge of the corresponding second opening OP2.

FIG. 9 is a sectional view of the connection end portion along line A-A of FIG. 8, and FIG. 10 is a sectional view of the connection end portion along line B-B of FIG. 8.

As shown in the figures, both side edges of each of the connection terminals 50 are covered with the base insulating layer 86a. Both end portions of each of the connection terminals 50 in the longitudinal direction, i.e., root portions of each of the connection terminals 50 on its both sides, are covered with the base insulating layer 86a. The through holes 50a of the connection terminals 50 are opened in the first openings OP1 and the opening 90. The second opening OP2 of the base insulating layer 86a is opened in the opening 90 of the cover insulating layer 86c.

According to the foregoing configuration, the peripheral edge portion of each of the connection terminals 50 is covered with the base insulating layer 86a and supported by the base insulating layer 86. Thus, the rigidity of the connection terminals 50 can be maintained even though the conductive layer (copper foil) forming the connection terminals 50 is decreased in thickness.

FIG. 11A is a sectional view showing a state in which the connection end portion 48c of the flexure is superposed on the connection pad group 72 of the bonding portion 64, and FIG. 11B is a sectional view of the connection end portion and the bonding portion which are bonded by solder.

When the connection end portion 48c of the flexure 48 configured as described above is soldered to the bonding portion 64 of the FPC unit, it is superposed on the connection pad group 72 of the bonding portion 64 as shown in FIG. 11A. The connection end portion 48c is disposed in a direction in which the cover insulating layer 86c is opposed to the bonding portion 64. The thirteen connection terminals 50 are each superposed on its corresponding connection pad 73 and solder layer 78 of the bonding portion 64 via the opening 90.

In this state, laser light is applied to the connection end portion 48c and the bonding portion 64 from the side of the connection end portion 48c. The laser light is applied to the connection terminals 50 and the solder layers 78 through the first openings OP1 of the connection end portion 48c. The solder layers 78 are melted by direct heat absorption of the connection terminals 50 and the solder layers 78, and thus the connection terminals 50 and the connection pads 73 are bonded together by solder. At the same time, the laser light is applied to the bonding portion (FPC) 64 through the second openings OP2 and the opening 90 of the connection end portion 48c, and the bonding portion 64 is heated. The heat of the bonding portion 64 is transmitted to the solder layers 78 through the connection pads 73 and contributes to the melting of the solder layers 78.

As shown in FIG. 11B, the melted solder layers 78 are spread over the surfaces of the connection terminals 50 alongside the cover insulating layer 86c, flows into the first openings OP1 through the through holes 50a of the connection terminals 50, and are also bonded to the opposite surfaces of the connection terminals 50. Accordingly, the connection terminals 50 and the connection pads 73 are electrically and mechanically bonded together by the solder layers 78 to ensure conductivity between them.

As shown in FIG. 1, while the actuator assembly 22 and FPC unit 21 configured as described above are incorporated into the base 12, the actuator assembly 22 is supported rotatably around the support shaft 26. Each of the magnetic disks 18 is located between two suspension assemblies 30. When the HDD is operated, the magnetic heads 17 attached to the suspension assemblies 30 are opposed to the upper and lower surfaces of the magnetic disks 18, respectively. The base portion 60 of the FPC unit 21 is fixed to the bottom wall 12a of the base 12.

According to the HDD and suspension assembly configured as described above, in the connection end portion 48c of the flexure 48, the peripheral edge portions of the connection terminals 50 are covered with and supported by the base insulating layer 86a.

Therefore, even though the conductive layer (copper foil) forming the connection terminals 50 is decreased in thickness, the strength and rigidity of the connection terminals 50 can be maintained, and the connection terminals can be prevented from being bent or the like during the manufacturing process. The decrease in thickness of the conductive layer makes it possible to narrow the pitches of the wires S formed by the conductive layer. The narrowing of the pitches makes it possible to decrease the width W1 of each of the connection end portions 48c and miniaturize the flexure 48 and the connection end portions 48c. In the first embodiment, in the connection end portion 48c, both root portions of the connection terminal are covered with the base insulating layer 86a over a wide range by narrowing the width of both end portions of each of the first openings OP1. Therefore, the strength and rigidity of the connection terminal can be improved in efficiency.

Furthermore, in the connection end portion 48c, the base insulating layer 86a is configured to have a plurality of second openings OP2 opposed to a space between connection terminals. Therefore, at the time of bonding the connection end portion 48c, laser light can be applied to the bonding portion 64 of the FPC through the second openings OP2 to generate heat from the bonding portion 64 and thus promote melting of the solder layers. This eliminates insufficient melting and non-bonding of solder to improve the reliability of bonding of the connection terminals.

As seen from the above, the first embodiment provides a suspension assembly capable of narrowing the pitches of wires and improving the bonding of the connection terminals while maintaining the strength of the connection terminals, and a disk device including the suspension assembly.

Next is a description of an HDD and a suspension assembly according to each of other embodiments will be described. In the other embodiments described below, the same components as those of the first embodiment are indicated by the same reference number or symbol and their detailed descriptions will be omitted and simplified, and components different from those of the first embodiment will mainly be described.

Second Embodiment

Figure 12A:
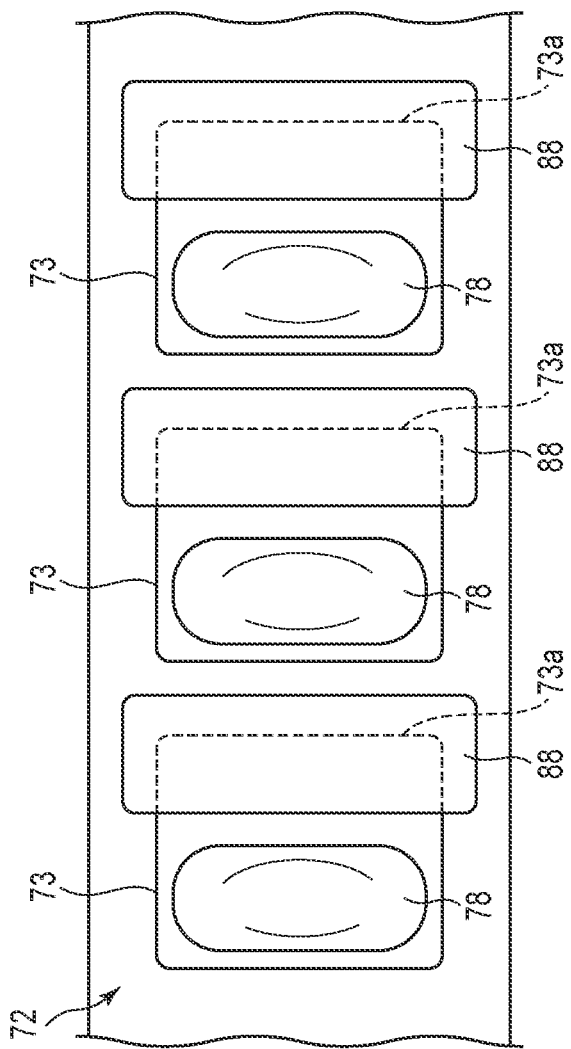
FIG. 12A is a schematic plan view showing an insulating layer, solder and a connection pad of a bonding portion of an HDD according to a second embodiment.
Figure 12B:
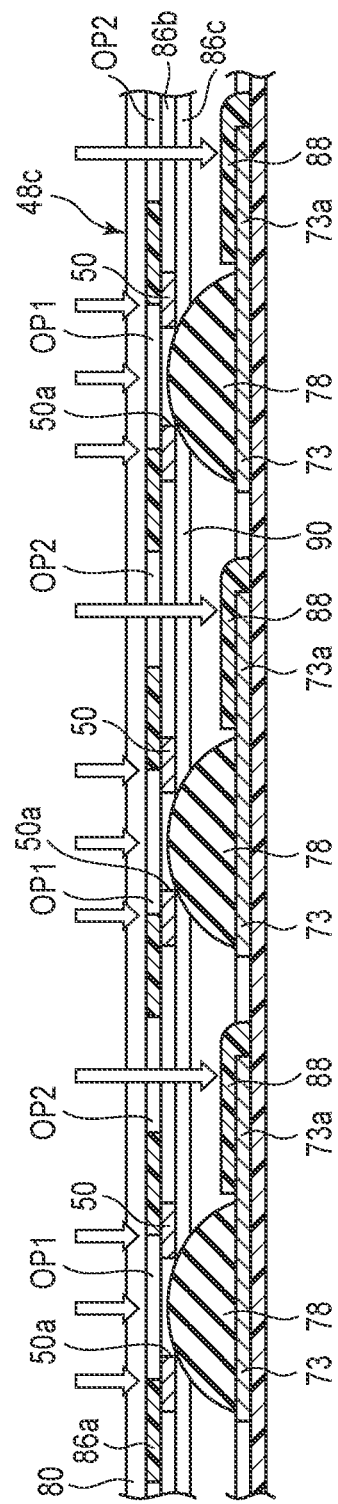
FIG. 12B is a sectional view of a tail connection end portion and a bonding portion which are bonded by solder.

FIG. 12A is a plan view showing part of the bonding portion 64 of the FPC in an HDD according to a second embodiment, and FIG. 12B is a sectional view showing a state in which the connection end portion 48c of the flexure is superposed on the connection pad group 72 of the bonding portion 64.

As shown in the figures, according to the second embodiment, each of the connection pads 73 of the bonding portion 64 integrally includes an extended portion 73a extended to a position opposed to a corresponding second opening OP2 of the connection end portion 48c. Resin layers (insulating layers) 88 of polyimide or the like are provided on their respective extended portions 73a and the bonding portion 64. The resin layers 88 are opposed to the second openings OP2, respectively.

As shown in FIG. 12B, at the time of bonding, laser light is applied to the connection terminals 50 and the solder layers 78 through the first openings OP1 of the connection end portion 48c. The solder layers 78 are melted by direct heat absorption of the connection terminals 50 and the solder layers 78, and thus the connection terminals 50 and the connection pads 73 are bonded together by solder. At the same time, the laser light is applied to the resin layer 88 of the bonding portion (FPC) 64 through the second openings OP2 and the opening 90 of the connection end portion 48c, and heat is absorbed by the resin layer 88. The heat of the resin layer 88 is transmitted to the solder layers 78 through the connection pads 73 and contributes to the melting of the solder layers 78. The melting property of the solder can thus be improved further.

In the second embodiment, the other configurations of the connection end portion 48c and bonding portion 64 are the same as those of the connection end portion and bonding portion in the foregoing first embodiment. The second embodiment can also bring about the same advantageous effects as those of the first embodiment.

Third Embodiment

Figure 13:
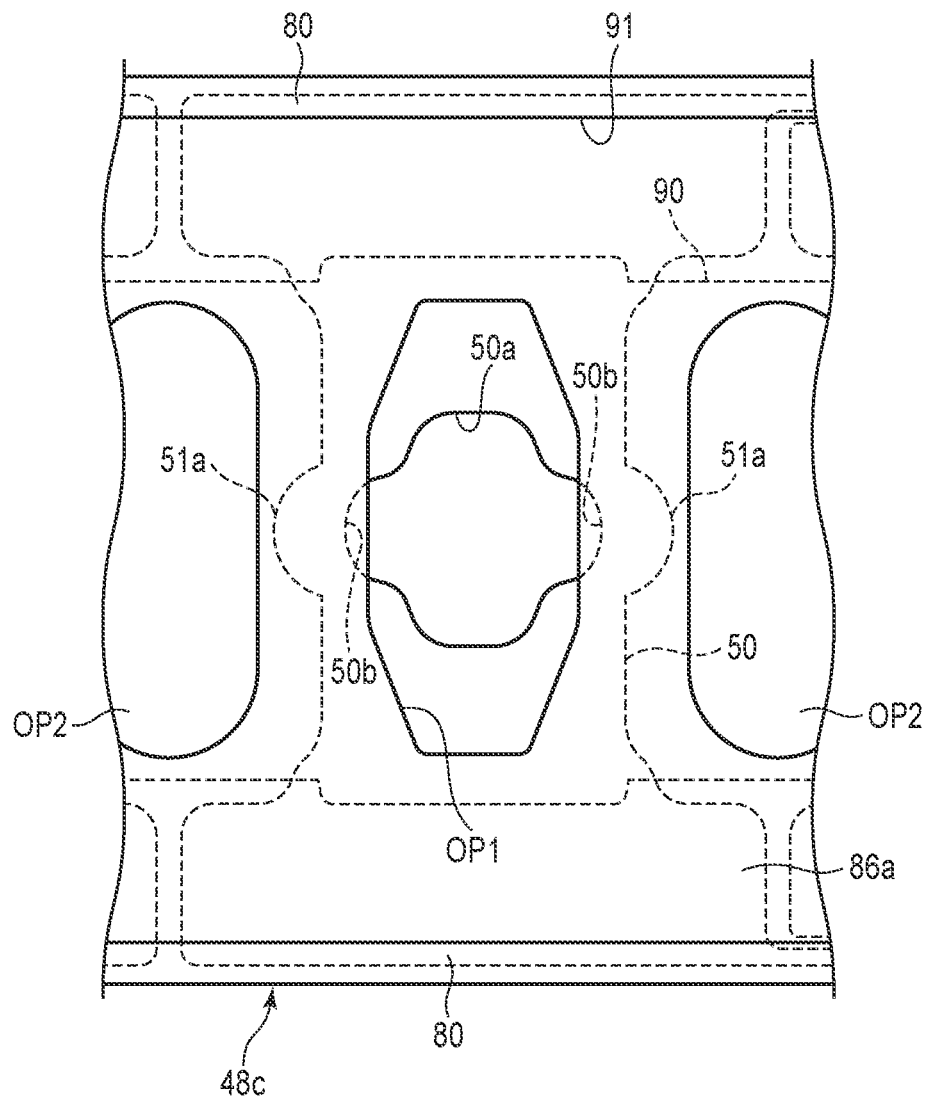
FIG. 13 is an enlarged plan view showing part of a tail connection end portion of an HDD according to a third embodiment.

FIG. 13 is an enlarged plan view showing part of a connection end portion of a flexure in an HDD according to a third embodiment.

As shown in FIG. 3, according to the third embodiment, both side edges of a connection terminal 50 and those of a through hole 50a are not straight, but have arcuate convex portions 50b and 51a which protrude toward the second openings OP2, respectively. The convex portion 50b is located substantially in the central part of the through hole 50a in the longitudinal direction of the side edges, and extends toward the second opening OP2 beyond the side edge of the first opening OP1. Similarly, the convex portion 51a is located substantially in the central part of the connection terminal 50 in the longitudinal direction of the side edges, and is opposed to the convex portion 50b in the width direction. The convex portions 50b and 51a are covered with a base insulating layer 86a. As described above, the convex portions 50b and 51a respectively provided on the side edge of the through hole 50a and the side edge of the connection terminal 50, thus making it possible to increase the area of the through hole 50a and increase the area of contact between the connection terminal 50 and the solder while maintaining the rigidity of the connection terminal 50. Thus, the bonding strength of the solder to the connection terminal 50 can be improved.

In the third embodiment, the other configurations of the connection end portion 48c are the same as those of the connection end portion in the foregoing first embodiment. The third embodiment can also bring about the same advantageous effects as those of the first embodiment.

Fourth Embodiment

FIG. 14 is a plan view of a connection end portion of the flexure in an HDD according to a fourth embodiment.

According to the fourth embodiment, the connection end portion 48c is configured to include fourteen connection terminals 50. As shown in FIG. 14, a cover insulating layer includes an opening 90 having length L2 of about 6 mm and width W2 of 0.5 mm, for example. The fourteen connection terminals 50 are each opposed to the opening 90 and are arranged at intervals in the longitudinal direction of the opening 90.

The width WT of each of the connection terminals 50 is set to 0.2 mm as in the first embodiment. In the fourth embodiment, one connection terminal 50(G) for a micro-actuator (piezoelectric element) is added. The connection terminal 50(G) is disposed at an end portion of the opening 90 on the most proximal side. The other thirteen connection terminals 50 are arranged in the same manner as in the first embodiment.

In one example, four connection terminals 50(R) for read heads, two connection terminals 50(S) for HDI sensors, two connection terminals 50(A) for assist elements (high-frequency assist elements or thermal assist elements), two connection terminals 50(H) for heaters, two connection terminals 50(W) for write heads, and finally, two connection terminals 50(G) for gimbal micro-actuators (GMA) (piezoelectric elements 53) are arranged in the order presented here from the extended end side of the connection end portion 48c. The connection terminals 50(A) for assist elements are arranged in a center part in the arrangement direction (6th and 7th connection terminals from the proximal-end side), the connection terminals 50(W) for write heads are arranged on the proximal-end side of the connection end portion 48c, and the connection terminals 50(H) for heaters are arranged between the connection terminals 50(A) and the connection terminals 50(W). The connection terminals 50(R) for read heads are arranged on the distal-end side of the connection end portion 48c, and the connection terminals 50(S) for HDI sensors are provided between the connection terminals 50(A) and the connection terminals 50(R).

The base insulating layer 86a that covers the connection terminals 50 and the wirers S includes a plurality of first openings OP1 and a plurality of second openings OP2 which are arranged in the longitudinal direction of the connection end portion 48c. The first openings OP1 are located to face their respective fourteen connection terminals 50. The second openings OP2 are located opposed to face a space between the connection terminals 50 and a space between one end of the opening 90 in its longitudinal direction and a connection terminal and a space between the other end there of the opening 90 and a connection terminal.

In the fourth embodiment, the other configurations of the connection end portion 48c are the same as those of the connection end portion 48c in the foregoing first embodiment. The third embodiment including fourteen connection terminals can also bring about the same advantageous effects as those of the first embodiment.

While certain embodiments have been described, these embodiments have been presented by way of example only, and are not intended to limit the scope of the inventions. Indeed, the novel embodiments described herein may be embodied in a variety of other forms;

furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The number of magnetic disks is not limited to five, but may be four or smaller or six or larger. The number of suspension assemblies has only to be increased or decreased in accordance with the number of magnetic disks to be placed, as does the number of magnetic heads. In the connection end portion of each of the suspension assemblies, the shape and size of a connection terminal, the shape and size of the first and second openings, or the like can be varied as necessary without being limited to those in the above-described embodiments. The type and function of the connection terminals can be varied according to the functions of the magnetic heads and suspension assemblies without being limited to those in the above-described embodiments.

What is claimed is:

1. A suspension assembly comprising:
a support plate;
a head supported by the support plate; and
a wiring member placed on the support plate,
wherein:
the wiring member includes a distal-end portion electrically connected to the head, a connection end portion extending outside the support plate, and a plurality of wires extending between the distal-end portion and the connection end portion; and
the connection end portion includes a cover layer with an opening having a predetermined length, thirteen or more connection terminals opposed to the opening, arranged at intervals in a length direction of the opening and connected to the wires, respectively, and a base layer superposed on the cover layer and the connection terminals and having a plurality of first openings opposed to part of each of the connection terminals and a plurality of second openings opposed to a space between adjacent connection terminals.

2. The suspension assembly of claim 1, wherein each of the connection terminals includes a through hole opened to the opening of the cover layer and a corresponding one of the first openings.

3. The suspension assembly of claim 2, wherein:
each of the connection terminals includes a pair of side edges opposed to each other at an interval therebetween in the length direction of the opening;
the through hole has a peripheral edge between the pair of side edges; and
the first openings are each larger than the through hole, and has a pair of side edges between each of the side edges of a corresponding one of the connection terminals and the peripheral edge of the through hole.

4. The suspension assembly of claim 3, wherein the second openings each have a peripheral edge adjacent to the side edges of the corresponding one of the connection terminals and a side edge of the opening of the cover layer at an interval therebetween.

5. The suspension assembly of claim 3, wherein:
the first openings each have both end portions opposed to a root portion of the corresponding one of the connection terminals; and
the both end portions are narrowed toward the root portion of the corresponding one of the connection terminals.

6. The suspension assembly of claim 3, wherein the side edges of the corresponding one of the connection terminals and the peripheral edge of the through hole each have a convex portion protruding toward the second openings.

7. The suspension assembly of claim 6, wherein the convex portion of the peripheral edge of the through hole protrudes toward the second openings beyond the side edges of the first openings.

8. The suspension assembly of claim 1, wherein:
the thirteen or more connection terminals include connection terminals for write heads, connection terminals for read heads, connection terminals for assist elements, connection terminals for heaters, connection terminals for HDI sensors, and a connection terminal for a micro-actuator;
the connection terminals for HDI sensors are arranged between the connection terminals for assist elements and the connection terminals for read heads; and
the connection terminals for heaters are arranged between the connection terminals for assist elements and the connection terminals for write heads.

9. A disk device comprising:
a disk-shaped recording medium including a recording layer; and
a head actuator comprising a rotatable actuator block, a plurality of arms extending from the actuator block, a circuit board having a plurality of connection pads arranged side by side and mounted on the actuator block, solder provided on the connection pads, and the suspension assembly recited in claim 1 fixed to each of the arms,
wherein the connection end portion of the wiring member is placed on the circuit board, and the connection terminals are bonded to the connection pads by the solder.

10. The disk device of claim 9, wherein:
each of the connection pads of the circuit board includes an extended portion opposed to a corresponding one of the second openings of the connection end portion; and
the circuit board includes a resin layer superposed on the extended portion and opposed to the second openings.

11. The disk device of claim 9, wherein each of the connection terminals includes a through hole opened to the opening of the cover layer and a corresponding one of the first openings.

12. The disk device of claim 11, wherein:
each of the connection terminals includes a pair of side edges opposed to each other at an interval therebetween in the length direction of the opening;
the through hole has a peripheral edge between the pair of side edges; and the first openings are each larger than the through hole, and has a pair of side edges between each of the side edges of a corresponding one of the connection terminals and the peripheral edge of the through hole.

13. The disk device of claim 12, wherein the second openings each have a peripheral edge adjacent to the side edges of the corresponding one of the connection terminals and a side edge of the opening of the cover layer at an interval therebetween.

14. The disk device of claim 9, wherein:
the thirteen or more connection terminals include connection terminals for write heads, connection terminals for read heads, connection terminals for assist elements, connection terminals for heaters, connection terminals for HDI sensors, and a connection terminal for a micro-actuator;
the connection terminals for HDI sensors are arranged between the connection terminals for assist elements and the connection terminals for read heads; and
the connection terminals for heaters are arranged between the connection terminals for assist elements and the connection terminals for write heads.

\* \* \* \* \*